M. Pechmann,
Bedstead Fastening

No. 64,699.          Patented May 14, 1867.

Witnesses.
Thos Tusche
Wm Trewin

Inventor.
Martin Pechmann
Per Munn & Co.
Attorneys

United States Patent Office.

MARTIN PECHMANN, OF NEW YORK, N. Y., ASSIGNOR TO HIMSELF AND J. F. C. PICKHARDT, OF SAME PLACE.

*Letters Patent No. 64,699; dated May 14, 1867.*

IMPROVED BEDSTEAD FASTENING.

*The Schedule referred to in these Letters Patent and making part of the same.*

TO ALL WHOM IT MAY CONCERN:

Be it known that I, MARTIN PECHMANN, of the city, county, and State of New York, have invented a new and useful Improvement in Screws and Nuts for Bedsteads and other purposes; and I do hereby declare that the following is a full, clear, and exact description thereof, which will enable others skilled in the art to make and use the same, reference being had to the accompanying drawings, forming part of this specification.

This invention is designed to obviate the difficulty attending the nuts of the bed-screws hitherto used, the nuts of the ordinary bed-screws in use being square, and requiring to be fitted in mortises in the rails, and when new nuts are required the removal of the old ones is attended with some trouble and difficulty, and the insertion of the nuts in the rails in the first place is attended with considerable expense, as the mortises have to be made in hard wood. My invention consists in having the nuts made in screws which may be screwed directly into auger holes made in the rails, whereby square mortises are avoided and the nuts rendered capable of being applied to and removed from the rails with the greatest facility. In the accompanying sheet of drawings—

Similar letters of reference indicate like parts.

A represents the bed-screw, which may be constructed in the usual way, and therefore does not require a special description. B is the nut which is of cylindrical form, and has a screw-thread on its exterior surface with a slot, $a$, in its outer end to admit of it being screwed into and out from an auger hole in the rail of the bedstead. The hole which receives the bed-screw A passes transversely through the cylinder, and is provided with an internal screw-thread to suit the thread of the screw A.

Figure 1:
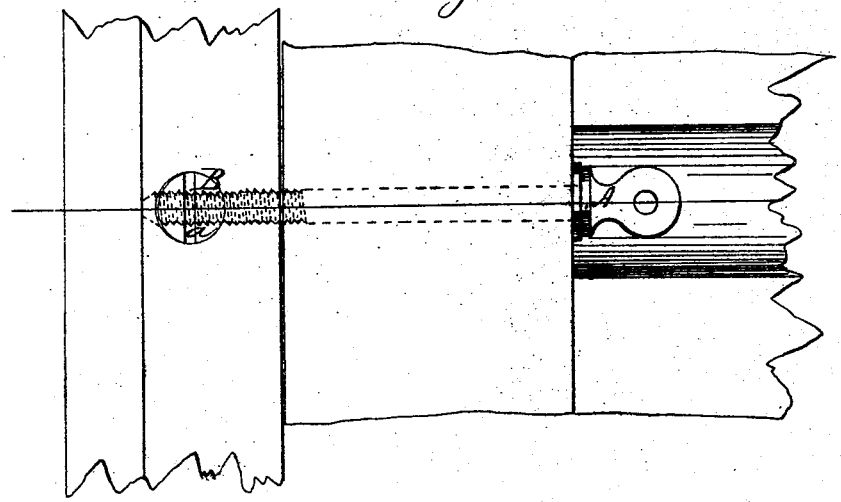
Figure 1 is a side view of my invention applied to a bedstead, a portion of which is shown in red.
Figure 2:
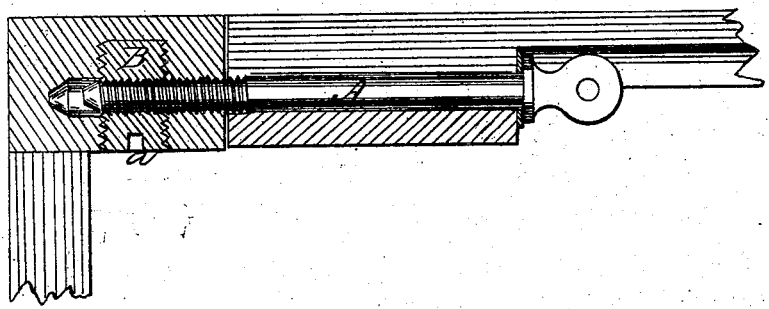
Figure 2 is also a side view of the same with the nut in section and also the portion of the bedstead to which the screw is applied.

From the above description it will be seen that in order to fit the nut B in the rail of the bedstead, all that is required is to bore an auger hole in the rail and screw the nut into it until the transverse hole is in line with the hole in the post through which the screw A passes, as will be fully understood by referring to fig. 2. In case the thread of the nut should become "stripped" at any time, the nut may be unscrewed from the rail and a new one inserted in its place without any difficulty whatever, and the cost of inserting the nuts in the rails will be extremely trifling, as auger holes are simply required to be bored in the rails to receive the nuts, the rectangular mortises which are necessary for the square nuts being avoided.

I claim as new, and desire to secure by Letters Patent—

The combination of a cylindrical nut B with a screw, A, substantially in the manner as and for the purpose specified.

The above specification of my invention signed by me this 21st day of February, 1867.

MARTIN PECHMANN.

Witnesses:
WM. F. McNAMARA,
ALEX. F. ROBERTS.